March 20, 1934.  R. H. VARIAN  1,951,716
APPARATUS FOR GEOPHYSICAL EXPLORATION
Filed Jan. 22, 1930   2 Sheets-Sheet 1

INVENTOR
Russell H. Varian
BY
W. E. Currie
ATTORNEY

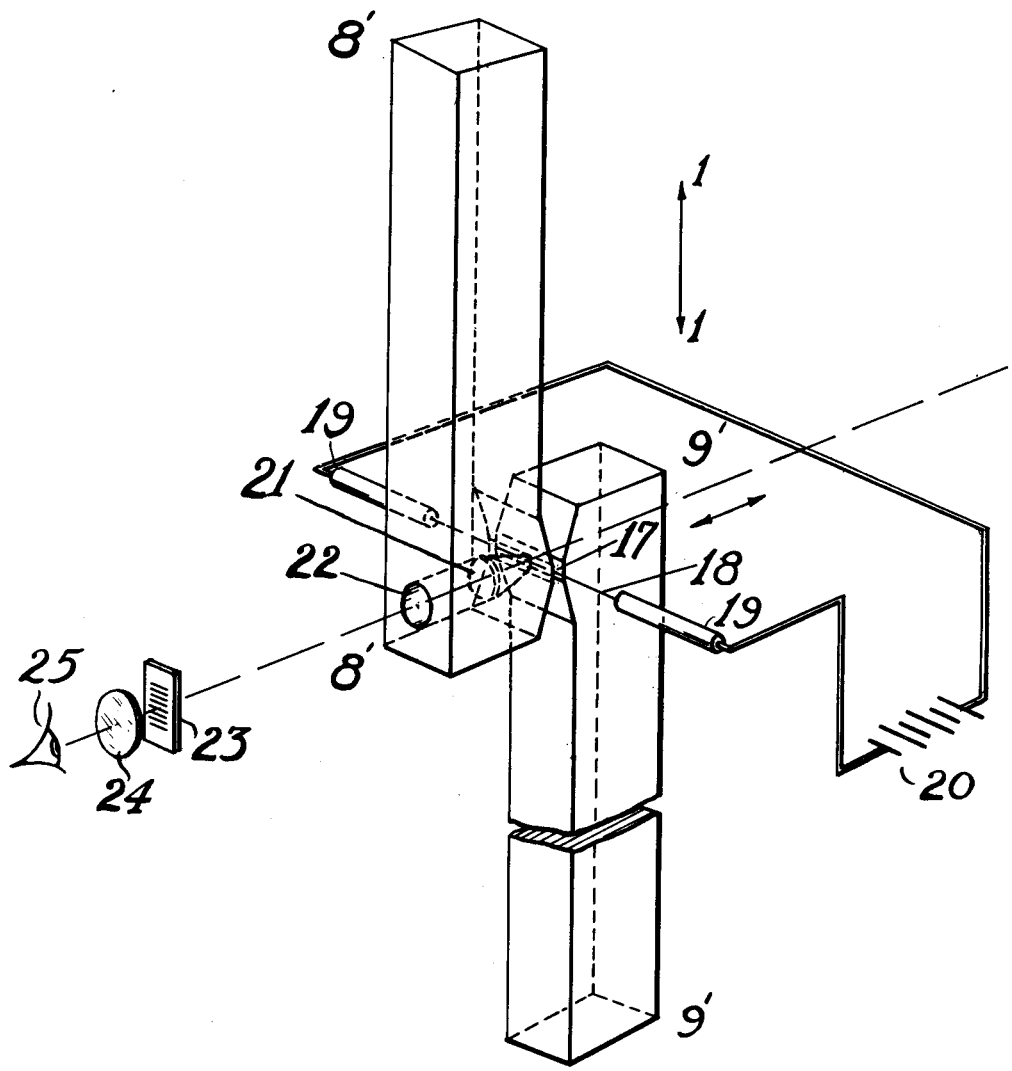

Patented Mar. 20, 1934

1,951,716

UNITED STATES PATENT OFFICE 1,951,716

APPARATUS FOR GEOPHYSICAL EXPLORATION

Russell H. Varian, Houston, Tex., assignor to Standard Oil Development Company, a corporation of Delaware Application January 22, 1930, Serial No. 422,593

4 Claims. (Cl. 175—182)

This invention relates to equipment for geophysical exploration. In certain respects it is an improvement upon the electrical underground exploration method described and claimed in the copending United States patent application of Orley H. Truman, Serial No. 334,340, filed January 22, 1929.

In the method of that application, a direct electric current is passed between two electrodes embedded in the earth. This current produces a magnetic field which is measured by suitable means such as the special form of magnetometer described in the application. After a few seconds the current is reversed, thereby reversing the magnetic field, and a new reading is made. A few such readings give the strength of the field due to the current, which, because of its reversals, is separated out from the steady magnetic field of the earth. From such measurements, made at a great number of points, the character of the underground structure is deduced.

In certain situations, this method has the disadvantage that small fluctuations constantly going on in the earth's magnetism, which take place in times comparable to those required for the above measurements, are superposed upon the field produced by the current and confuse the results.

I have found that increased accuracy is obtained by the use of a periodically vibrating or oscillating body having its frequency tuned to that of the current reversals, and responsive to the effect of the magnetic fields produced by the current. By a resonance effect, the amplitude of the vibration is increased to such an extent as to permit ready measurement.

In accordance with this invention, a resonant magnetometer, tuned to a certain frequency, is used, and the current is reversed to correspond with that frequency. The effect of the field produced by the current is greatly predominant over that of the field due to the earth. For the latter, having a great variety of frequencies, is relatively at a great disadvantage.

For this purpose the magnetometer described in application No. 334,339 could be used, by merely cutting down the damping and suitably adapting the period. Other forms, however, which are included in this invention, are preferable because they have greater sensitivity.

The nature of these devices can be best understood from the attached drawings, in which:

Fig. 4 is still another form of magnetometer, alternative to Fig. 1.

Figures 1, 2, 3:
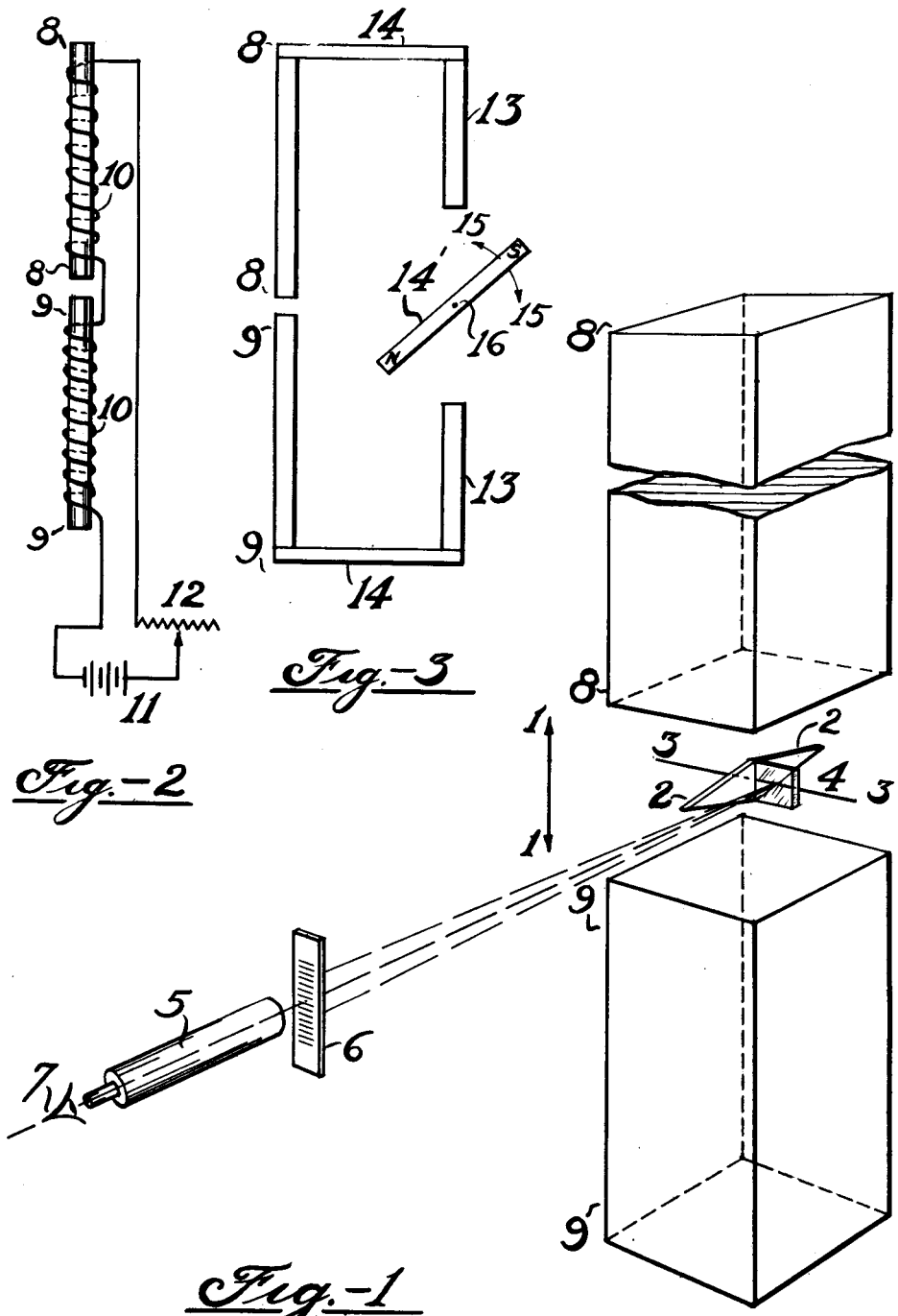
Fig. 1 is a diagrammatic view in perspective of one form of my device.
Fig. 2 is a diagram of a compensating device to be used with the instrument shown in Figs. 1 and 4.
Fig. 3 is an alternative form to Fig. 2.

Referring now to Fig. 1, this figure shows a form of my device adapted for measuring a magnetic field in the direction of arrow 1—1. It will be understood that this may be any direction in space—up and down, east and west, or any other.

A magnetic needle 2—2 is mounted to turn about an axis 3—3, the axis being at right angles to the field to be measured. This axis is preferably a fine wire or quartz fibre upon which the needle is suspended, and on which it can rotate to and fro without friction. To the needle is attached mirror 4. At a suitable distance is placed telescope 5 and scale 6, by which the deflections of the mirror are observed by the eye at 7. As an alternative to these, many other equivalent devices will suggest themselves to those familiar with the art. For example, scale 6 may be replaced by a small illuminated slit, the apparent deflections of which, caused by the swings of mirror 4, are read by a scale in the telescope 5.

It is now to be seen that if this device is placed in a magnetic field, periodically reversed in the direction of 1—1, and if the natural frequency of the needle is made to correspond with the frequency of the field, it will build up its oscillations by resonance to a much greater degree than as if they were caused by an irregularly varying magnetic field, like that of the earth.

The sensitivity of this device can be greatly improved by placing the needle 2—2 between the closely approximated ends of two long bars 8—8 and 9—9, the bars being made of some material of very high magnetic permeability, and placed parallel to 1—1. By its property of providing an easier path for the magnetic lines of force, a great many more will be concentrated upon the needle 2—2 than would otherwise be the case.

The steady field of the earth will likewise be concentrated by these bars, and will produce a deflection of needle 2 far greater than that caused by the fields it is desired to investigate. It is preferable, then, to provide means to remove this, two of which are shown in Figs. 2 and 3.

In Fig. 2, bars 8—8 and 9—9 are shown surrounded by coils of wire 10—10, through which an electric current is caused to flow from the battery 11. If this current is suitably regulated by the resistance 12, it will serve to annul the steady component above spoken of, leaving the variable component alone to be measured.

As an alternative to this, Fig. 3 shows bars 8—8 and 9—9 provided with auxiliary bars 13—13, connected to them by yokes 14—14, or made integrally with them, as desired. Between the ends of bars 13—13 is placed a permanent magnet 14', which can be rotated to and fro in direction of arrow 15—15 about an axis 16. It is now obvious that by suitably setting magnet 14' any steady field originally existing between the ends of bars 8 and 9 can be annulled. At the same time, by properly proportioning bars 13 and magnet 14', it can be secured that not too much of the flux from outside passing through bars 8 and 9 is diverted to the path 13—14'—13, where it contributes nothing to the effect upon the needle.

In Fig. 4 is shown another, still more sensitive, method of measuring the alternating magnetic field. In this figure, 1—1 is as before the direction of the field to be measured. Bars 8'—8', 9'—9', of high permeability material, similar in function to bars 8—8 and 9—9 are provided. In this case their ends are shaped so as to bring them very close together, leaving a narrow gap 17. In this gap is stretched a fine conducting wire or fibre 18, between fixed supports 19—19. Through this wire is run a steady electric current, from battery 20, or other suitable source.

It is now seen that the outside magnetic field would be very strongly concentrated in gap 17, and will cause wire 18 to move in one direction or the other, according to the direction of the field and the current. If the field reverses at periodic intervals, and if the wire is, by suitable choice of dimensions and tension upon it, tuned to the corresponding frequency, it will vibrate sufficiently to be measured, even as the result of a very weak field.

To facilitate the vibration, by lessening the loss of energy from the wire, it may be inclosed in a tight case, from which the air is removed.

A convenient way to observe the vibrations of the wire is by means of the microscope objective 21, placed in a hole 22, and casting an image of the wire upon scale 23. Both scale and image are magnified by an eyepiece 24, and viewed by the eye 25. Just as with the form of the instrument shown in Fig. 1, the amplitude of vibration observed will be proportioned to the field producing it, over a sufficiently wide range.

As in the other form of the instrument, for the highest accuracy the steady field due to the earth must be removed. In order to do this, the same means already shown in Figs. 2 and 3 may be used.

It will be understood that, in Fig. 4, the ends of bars 8', 9' can be shaped in a great variety of ways, the sole object being to provide a very narrow gap, and at the same time allow the vibrations of wire 18 to be observed with a microscope objective.

It will be understood that in this process of exploration the current reversals are to follow each other at long enough intervals so that the secondary currents produced at each reversal will have no important effect. This reversal method is very easily performed. For in the first place the secondary currents will die down in a small fraction of a second, so that even though the current reversals follow each other several times per second, the secondary current produced by each reversal will occupy only a small fraction of the time of that reversal.

As an alternative to reversing the current at periodic intervals, giving what is known in electrical theory as a stepped wave, an ordinary alternating current of an approximately sine wave form could be used, and would register equally as well on my resonant magnetometer. The secondary currents produced in the ground would then have the same frequency as the current put in, but they would decrease in magnitude as it decreased in frequency. By making its frequency sufficiently low, therefore, the secondary currents could be reduced to unimportance. The use of approximately sine wave alternating current, instead of a stepped wave current, is therefore claimed as a part of this invention.

The method of deducing sub-surface conditions from magnetometer readings is well understood by those skilled in the art and need not be described here.

Various changes and alternative arrangements may be made with the scope of the appended claims, in which I wish to include all novelty inherent in the invention.

I claim:

1. Apparatus for measuring the magnetic field produced by a periodically reversed electric current passing through the earth, comprising a body responsive to magnetic influence and adapted to vibrate or oscillate at the frequency of the current, means for concentrating upon said body, a magnetic field produced by the current, and means for annulling any steady magnetic field that may be present.

2. A resonant magnetometer composed of a magnet oscillating about an axis in a definite period, means for observing the oscillations of said magnet, means for concentrating upon said magnet the alternating magnetic field to be measured, and means for annulling any steady magnetic field that may be present, substantially as above described.

3. In a resonant magnetometer, means for concentrating the magnetic field to be measured into a small gap, a wire stretched in said gap, carrying a direct electric current, and tuned to vibrate at a definite frequency, means for observing the vibrations of said wire, and means for annulling any steady magnetic field, substantially as above described.

4. In a resonant magnetometer, a body responsive to magnetic influence and adapted to vibrate at a predetermined frequency, means for concentrating the magnetic influence, and comprising two bars of magnetic permeability having their ends closely spaced and with the body lying between them and means within the end of one of said bars permitting observation of the vibration of the body.

RUSSELL H. VARIAN.